Figures 1, 2:
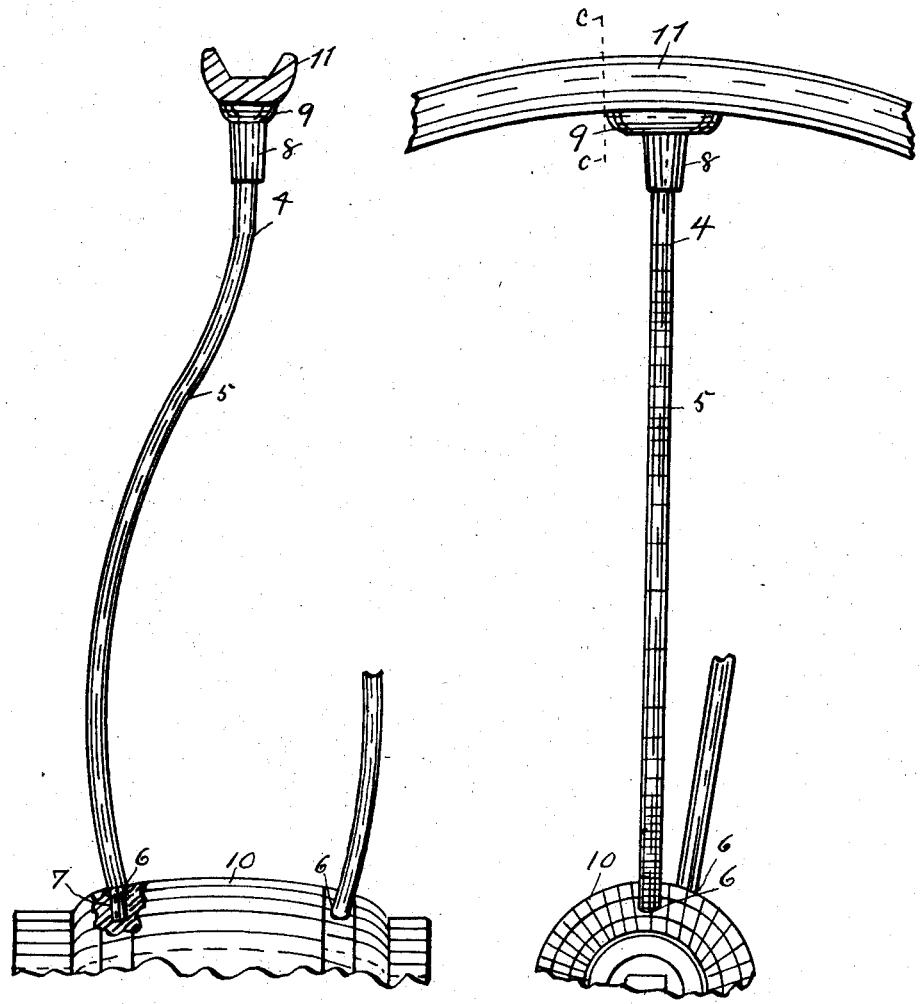

No. 706,659. Patented Aug. 12, 1902.
H. G. M. HOWARD.
ELASTIC STEEL SPOKE FOR VEHICLE WHEELS.
(Application filed Dec. 30, 1901.)
(No Model.)

WITNESSES:
Shea C. West.
R. G. West.

INVENTOR.
Henry G. M. Howard,
BY Lucius C. West.
ATTORNEY.

THE NORRIS PETERS CO., PHOTO-LITHO., WASHINGTON, D. C.

UNITED STATES PATENT OFFICE.

HENRY G. M. HOWARD, OF KALAMAZOO, MICHIGAN.

ELASTIC STEEL SPOKE FOR VEHICLE-WHEELS.

SPECIFICATION forming part of Letters Patent No. 706,659, dated August 12, 1902.

Application filed December 30, 1901. Serial No. 87,763. (No model.)

*To all whom it may concern:*

Be it known that I, HENRY G. M. HOWARD, a citizen of the United States, and a resident of Kalamazoo, in the county of Kalamazoo, State of Michigan, have invented a new and useful Elastic Steel Spoke for Vehicle-Wheels, of which the following is a specification.

The object of this invention is to provide elastic steel spokes for vehicle-wheels constructed in the improved manner set forth, with a design to increase their attractiveness in appearance, improve the elastic action in the wheel, overcome the evil effects of expansion and contraction, prevent what is termed "crystallization" of the elastic steel, and thus decrease danger of breakage of the spokes, and to facilitate the attachment of the spokes to the wheel-rim, all as more fully described below.

In the drawings forming a part of this specification, Figure 1 is a cross-section of the wheel-rim in Fig. 2 on dotted line $cc$, also showing a broken portion of a hub in side elevation, a spoke attached to the rim and hub, and another spoke broken away; and Fig. 2 is an elevation of Fig. 1 looking from a point at the right.

Referring to the parts of the drawings pointed out by numerals, the elastic part of the spoke consists of a short vertically-straight portion 4, made in the elastic rod, of which the spoke itself is composed, below this a short bowed portion between 4 and 5, below this a long bowed portion between 5 and 6, said bowed portions bending in directions laterally and inversely to each other, and below the long bowed portion an inwardly-oblique straight short portion 7 for attachment to the hub. This portion 7 not only is oblique, but it extends in a lateral direction or toward the side of the wheel, or, rather, it would be toward the center of the hub between the ends thereof, as it is the intention to build the wheels with some spokes on one side and some on the other of the wheel. These two bowed and two straight portions are of course end to end and integral with each other. The upper end of the spoke proper consists of a T-head comprising the flat cap 9 for attachment to the inner side of the wheel-rim 11 and of the stem 8, integral with the cap 9. This T-head is made solid with the short straight portion 4 of the spoke and constitutes a part of the spoke proper. As stated, it is designed to build the wheels with spokes on both sides—that is, some spokes near one end of the hub 10, as shown by the complete spoke in the drawings, and spokes near the other end of the hub 10, as indicated by the broken spoke, said spokes being jogged by each in their relation to each other and their attachment to the hub 10 and to follow in line with each other at their attachment to and around the rim 11. (Shown broken in Fig. 2.) This T-head may be made separate from the portion 4 and then be attached solidly to it, or the T-head and the balance of the spoke may be formed integrally out of the same piece of metal. It will be observed that the straight portion 4 is below the stem of the T-head and constitutes a portion of the elastic part of the spoke and made of the same material. The T-head being rigid itself and rigidly attached to the elastic straight portion 4 causes the pressure on the rim, even such as caused by a stone which one edge or side of the rim runs over, to be evenly distributed in its effect into the straight portion 4, and thus have the same even effect on the elasticity of the entire spoke as would a pressure squarely on the rim impart. The pressure on the T-head acts directly on the short straight portion 4, but is immediately distributed into the inversely-bowed portions below 4 and above 6 in a manner that its effect bows these portions elastically a little farther in the inverse directions, thus breaking up and distributing the elastic action in a manner that no undue and unsightly bulging of the bows of the spokes is experienced, and the effect of the endwise pressure on the spokes is prevented from concentrating at any point throughout the length of the spokes with a sufficient continued force to produce the heretofore-complained-of crystallization of the grains of the steel, causing breakage, and the expansion of the spokes from the effects of heat and the contraction from the effects of cold have no evil effects on the wheels.

A feature in the spokes thus made is their increased attractiveness, imparting to the wheels an appearance of beauty and finish.

The T-heads may have more than one branch, like the part above 4, between 4 and 5, between 5 and 6, and the part 7, if preferred, being just a duplication, but not here shown.

Having thus described my invention, what I claim as new, and desire to secure by Letters Patent of the United States of America, is—

Elastic metal spokes for vehicles, comprising as a continuous whole, a rigid T-head at outer end; a short straight portion immediately below and made from the elastic part of the spoke; a short bowed portion and a longer bowed portion below and bending in directions laterally and inversely to each other shown; and a short inward laterally-oblique portion at the lower end, substantially as set forth.

In testimony whereof I have signed my name to this specification in the presence of two subscribing witnesses.

HENRY G. M. HOWARD.

Witnesses:
WILL R. McGRAW,
W. F. DORGAN.